(12) United States Patent
Abasov et al.

(10) Patent No.: US 8,125,483 B2
(45) Date of Patent: Feb. 28, 2012

(54) SYSTEMS AND METHODS FOR IMAGING RELATIONSHIP DATA IN A THREE-DIMENSIONAL IMAGE

(75) Inventors: Shahin Abasov, Houston, TX (US); Ron Mossbarger, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 926 days.

(21) Appl. No.: 12/151,201

(22) Filed: May 5, 2008

(65) Prior Publication Data

US 2009/0273599 A1  Nov. 5, 2009

(51) Int. Cl.
*G06T 15/00* (2011.01)
(52) U.S. Cl. ........................................................ 345/419
(58) Field of Classification Search .................... 345/419
See application file for complete search history.

(56) References Cited

U.S. PATENT DOCUMENTS

| | | | |
|---|---|---|---|
| 6,519,531 B1 | 2/2003 | Batycky et al. | |
| 7,289,942 B2 * | 10/2007 | Yang et al. | 703/10 |
| 7,634,395 B2 * | 12/2009 | Flandrin et al. | 703/10 |
| 7,680,640 B2 * | 3/2010 | Camilleri | 703/10 |
| 2002/0035443 A1 * | 3/2002 | Matteucci et al. | 702/155 |

* cited by examiner

*Primary Examiner* — Ryan R Yang
(74) *Attorney, Agent, or Firm* — Crain Caton & James

(57) ABSTRACT

Systems and methods for imaging relationship data as a three-dimensional image, which include rendering a three-dimensional image of an object having at least one attribute, an input marker relative to the object, an output marker relative to the object, and an input/output relationship. A data structure comprising a data field, the data field comprising a three-dimensional image of an input marker, an output marker, an object having at least one attribute and an input/output relationship.

26 Claims, 3 Drawing Sheets
(1 of 3 Drawing Sheet(s) Filed in Color)

SYSTEMS AND METHODS FOR IMAGING RELATIONSHIP DATA IN A THREE-DIMENSIONAL IMAGE

CROSS REFERENCE TO RELATED APPLICATIONS

Not applicable.

STATEMENT REGARDING FEDERALLY SPONSORED RESEARCH OR DEVELOPMENT

Not applicable.

FIELD OF THE INVENTION

The present invention generally relates to systems and methods for selectively imaging relationship data in a three-dimensional image comprising multiple three-dimensional objects. More particularly, the present invention relates to imaging an input/output relationship in a three-dimensional image.

BACKGROUND OF THE INVENTION

In some fields, it is useful to model objects in three dimensions. Modeling such objects proves useful in a variety of applications, particularly where one position is related to another position. For example, modeling the relationship between an input and a response in the human body is useful for medical training exercises, diagnoses, performing remote surgery or for other medical applications. Similarly, modeling the relationship among injection wells and production wells in a reservoir is useful for generating production from oil deposits and recognizing the relationship with other geological applications. The foregoing objects are exemplary only, and other fields may likewise find utility in modeling various objects.

In the field of life sciences, data may be compiled for an output, such as blood pressure, as a function of input, such as an external counterpulsation treatment or angina, where the lower limbs are sequentially squeezed by a cuff, often a pneumatic bladder, during the resting phase of the heart to force blood to the heart and increase the heart's output.

In the field of earth sciences, data is compiled for production well output, as a function of injection well input, to aid in increasing production. In such systems, fluid or gas may be injected into a reservoir via an injection well, resulting after some time in an increase in production at the production well. The data stored for each such system may include well position and depth for each well as well as production output response as a function of injection well operation. This relationship data includes a relationship known as a well allocation factor.

Relationship data is often presented in two-dimensional formats, such as a pie chart or a bar chart. Two-dimensional data formats, however, fail to convey other essential data such as, for example, the positions of input and output sources relative to each other and a related object-like a reservoir grid. Two-dimensional formats are particularly inefficient when attempting to gain a global perspective of the object. When the number of related input sources and/or output sources increase, the two-dimensional data format becomes even more awkward to use.

Thus, there is a need for imaging relationship data in a three-dimensional image which includes an image of the positions of input and output sources relative to each other and a related object.

SUMMARY OF THE INVENTION

The present invention therefore, meets the above needs and overcomes one or more deficiencies in the prior art by providing systems and methods for imaging relationship data in a three-dimensional image.

In one embodiment, the present invention includes a method for imaging relationship data as a three-dimensional image, which comprises i) rendering an object; ii) rendering an input marker relative to the object, iii) rendering output marker relative to the object; iv) processing the input marker and the output marker to produce an input/output relationship; and v) rendering a three-dimensional image of the input marker, the output marker, the object and the input/output relationship.

In one embodiment, the present invention includes a method for imaging relationship data as a three-dimensional image, which comprises i) rendering an object, wherein the object is a three-dimensional reservoir grid having a plurality of grid cells and includes at least one attribute representing one of amplitude, frequency, phase, power, semblance, coherency, dip, azimuth, gradient, fluid factor, acoustic impedance, velocity, pressure, porosity, permeability, stratigraphy and lithology; ii) rendering an input marker relative to the object; iii) rendering output marker relative to the object; iv) processing the input marker and the output marker to produce an input/output relationship; v) rendering a three-dimensional image of the input marker, the output marker, the object and the input/output relationship using a computer processor; and vi) displaying the three-dimensional image of the input marker, the output marker, the object and the input/output relationship.

In another embodiment, the present invention includes a non-transitory computer-readable medium tangibly carrying computer executable instructions for imaging relationship data as a three-dimensional image. The instructions are executable to implement: i) rendering an object, wherein the object is a three-dimensional reservoir grid having a plurality of grid cells and includes at least one attribute representing one of amplitude, frequency, phase, power, semblance, coherency, dip, azimuth, gradient, fluid factor, acoustic impedance, velocity, pressure, porosity, permeability, stratigraphy and lithology; ii) rendering an input marker relative to the object; iii) rendering output marker relative to the object; iv) processing the input marker and the output marker to produce an input/output relationship; v) rendering a three dimensional image of the input marker, the output marker, the object and the input/output relationship; and vi) displaying the three-dimensional image of the input marker, the output marker, the object and the input/output relationship.

In yet another embodiment, the present invention includes a non-transitory computer-readable medium tangibly carrying a data structure stored thereon, the data structure comprising a data field, the data field comprising a three-dimensional image of an input marker, an output marker, an object and an input/output relationship, wherein the object is a three-dimensional reservoir grid having a plurality of grid cells and includes at least one attribute representing one of amplitude, frequency, phase, power, semblance, coherency, dip, azimuth, gradient, fluid factor, acoustic impedance, velocity, pressure, porosity, permeability, stratigraphy and lithology.

BRIEF DESCRIPTION OF THE DRAWINGS

The patent or application file contains at least one drawing executed in color. Copies of this patent or patent application with color drawing(s) will be provided by the U.S. Patent and Trademark Office upon request and payment of the necessary fee.

The present invention is described below with references to the accompanying drawings in which like elements are referenced with like numerals, and in which.

DETAILED DESCRIPTION OF THE PREFERRED EMBODIMENTS

The subject matter of the present invention is described with specificity; however, the description itself is not intended to limit the scope of the invention. The subject matter thus, might also be embodied in other ways, to include different steps or combinations of steps similar to the ones described herein, in conjunction with other present or future technologies. Moreover, although the term "step" may be used herein to describe different elements of methods employed, the term should not be interpreted as implying any particular order among or between various steps herein disclosed unless otherwise expressly limited by the description to a particular order.

Method Description

Figure 1:
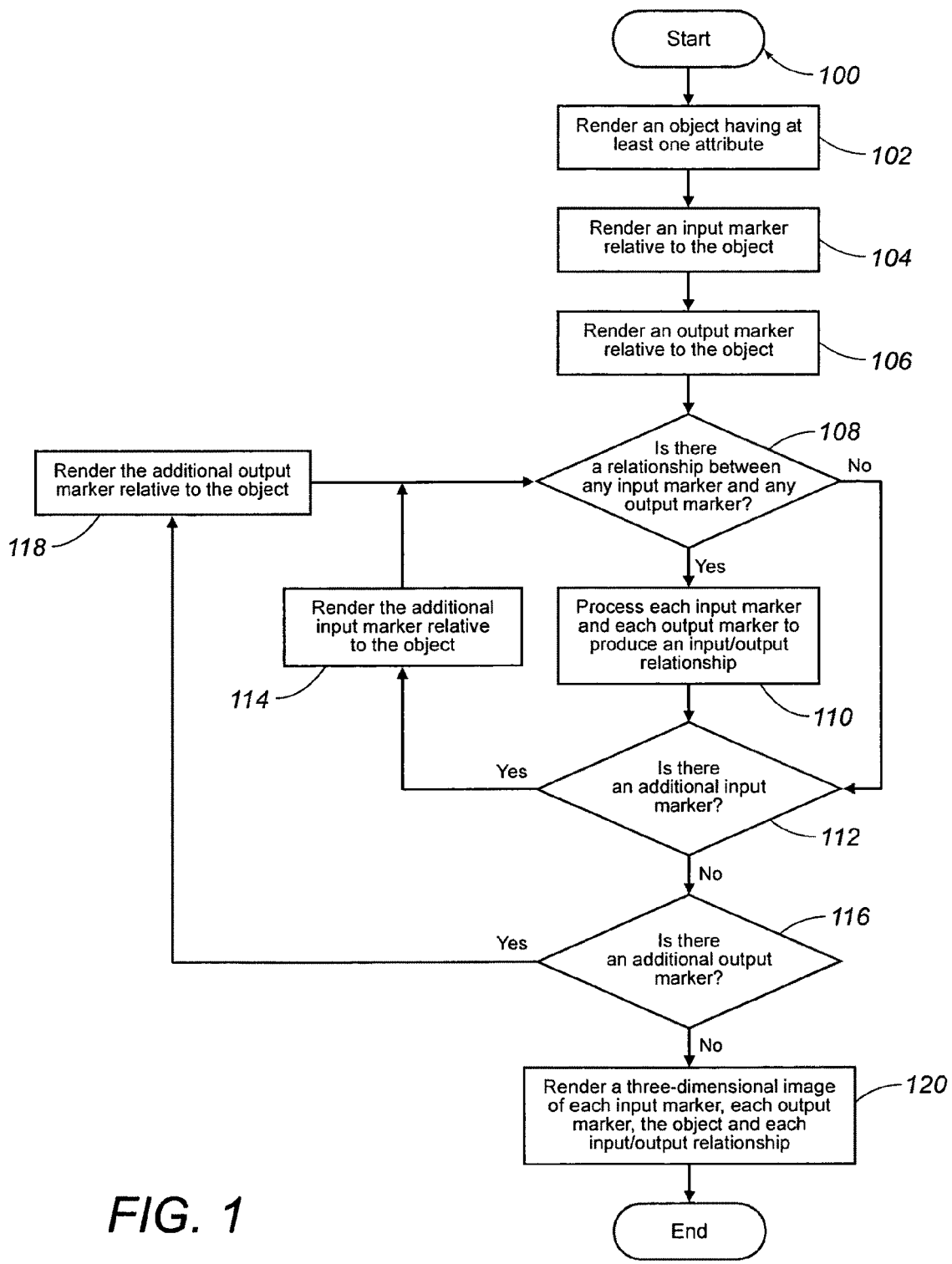
FIG. 1 is a flow diagram illustrating one embodiment of a method for implementing the present invention.

Referring now to FIG. 1, a flow diagram illustrates one embodiment of a method 100 for implementing the present invention.

In step 102, an object having at least one attribute is rendered using conventional graphical rendering techniques, which are well known in the art.

In step 104, an input marker is rendered relative to the object using conventional graphical rendering techniques, which are well known in the art. The input marker may be rendered based upon a predetermined position for the input marker or a selected position for the input marker. The input marker may be rendered on, in or near the object-depending on the application.

In step 106, an output marker is rendered relative to the object using conventional graphical rendering techniques, which are well known in the art. The output marker may be rendered based upon a predetermined position for the output marker or a selected position for the output marker. The output marker may be rendered on, in or near the object-depending on the application.

In step 108, method 100 determines if there is a relationship between any input marker and any output marker. If there is a relationship, then the method 100 proceeds to step 110. If there is no relationship, then the method 100 proceeds to step 112. The relationship may be described, for example, as an input/output relationship wherein an input affects the output.

In step 110, each input marker and each output marker are processed to produce an input/output relationship. The input/output relationship may represent the input of the input marker relative to the output of the output marker. Further, the input of the input marker may reflect external input and the output of the output marker may reflect object output.

In step 112, the method 100 determines if there are additional input markers. If there is an additional input marker, then the method 100 proceeds to step 114. If there is no additional input marker, then the method 100 proceeds to step 116.

In step 114, an additional input marker is rendered relative to the object using conventional graphical rendering techniques, which are well known in the art, and then proceeds to step 108 where the method 100 may be repeated for each additional input marker.

In step 116, the method determines if there are additional output markers. If there is an additional output marker, then the method 100 proceeds to step 118. If there is no additional output marker, then the method 100 proceeds to step 120.

In step 118, an additional output marker is rendered relative to the object using conventional graphical rendering techniques, which are well known in the art, and then proceeds to step 108 where the method 100 may be repeated for each additional output marker.

In step 120, a three-dimensional image of each input marker, each output marker, the object and each input/output relationship is rendered using conventional graphical rendering techniques, which are well known in the art.

System Description

The present invention may be implemented through a computer-executable program of instructions, such as program modules, generally referred to as software, being executed by a computer. Generally, program modules include routines, programs, objects, components, data structures, etc., that perform particular tasks or implement particular abstract data types. The software forms an interface to allow a computer to react according to a source of input. AssetView®, which is a commercial software application marketed by Landmark Graphics Corporation, may be used as an interface application to implement the present invention. AssetView® provides the tools by which the user may visually restrict the data displayed to the relationships of interest and review the data presented in an uncluttered manner, particularly when multiple relationships are to be concurrently communicated. The software may also cooperate with other code segments to initiate a variety of tasks in response to data received in conjunction with the source of the received data. The software may be stored onto any variety of memory media such as CD-ROM, magnetic disk, bubble memory and semiconductor memory (e.g., various types of RAM or ROM). Furthermore, the software and its results may be transmitted over a variety of carrier media such as optical fiber, metallic wire, free space and/or through any of a variety of networks such as the internet.

Additionally, the software may include a data structure stored thereon. The data structure may comprise one or more data fields, at least one data field comprising a three-dimensional image of an input marker, an output marker, an object having at least one attribute and an input/output relationship. The input/output relationship may be represented as a connection between the input marker and the output marker, wherein at least one of a color and a size of the connection represents an allocation factor. Optionally, the input/output relationship may be represented as a value between the input marker and the output marker. The at least one attribute represents one of amplitude, frequency, phase, power, semblance, coherency, dip, azimuth, gradient, fluid factor, acoustic impedance, velocity, pressure, porosity, permeability, stratigraphy and lithology. The object may comprise a three-dimensional reservoir grid having a plurality of grid cells, wherein the reservoir grid represents all, or a portion of, a reservoir. Each grid cell may represent an attribute value. The data structure may further comprise another data field, wherein the another data field includes a three-dimensional image of another input marker, another output marker, the object and another input/output relationship.

Moreover, those skilled in the art will appreciate that the invention may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present invention, including local workstations and visualization stations. The invention may be practiced in distributed-computing environments where tasks are performed by remote-processing devices that are linked through a communications network. In a distributed-computing environment, program modules may be located in both local and remote computer-storage media including memory storage devices. The computer-executable instructions form an interface to allow a computer to react according to a source of input. The instructions cooperate with other code segments to initiate a variety of tasks in response to data received in conjunction with the source of the received data. The present invention may therefore, be implemented in connection with various hardware, software or a combination thereof, in a computer system or other processing system.

Figure 2:
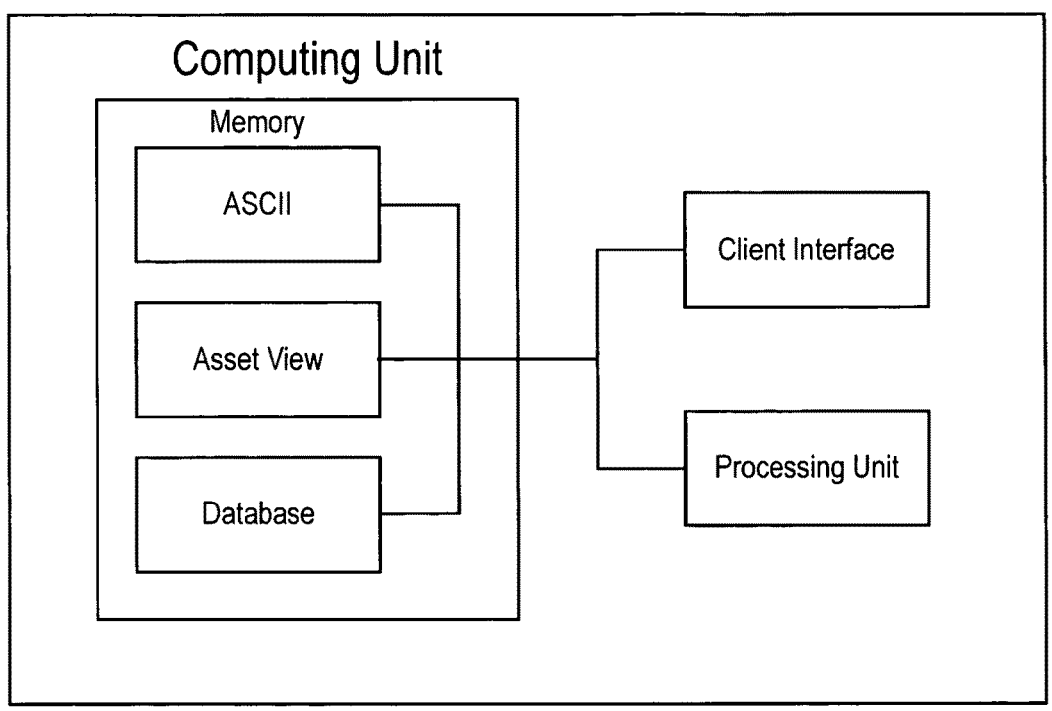
FIG. 2 is a block diagram illustrating one embodiment of a computer system for implementing the present invention.

Referring now to FIG. 2, a block diagram of a system for implementing the present invention on a computer is illustrated. The system includes a computing unit, sometimes referred to a computing system, which contains memory, application programs, a data base, ASCII files, a client interface, and a processing unit. The computing unit is only one example of a suitable computing environment and is not intended to suggest any limitation as to the scope of use or functionality of the invention.

The memory primarily stores the application programs, which may also be described as a program module containing computer-executable instructions, executed by the computing unit for implementing the present invention described herein and illustrated in FIG. 1. The memory also includes AssetView®, which can be used to display data and data results. The memory database may be used to supply data and store data results. ASCII files may also be used to supply data and store data results.

Although the computing unit is illustrated as having a generalized memory, the computing unit typically includes a variety of computer readable media. By way of example, and not limitation, computer readable media may comprise computer storage media and communication media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to and/or presently being operated on by the processing unit. By way of example, and not limitation, the computing unit includes an operating system, application programs, other program modules, and program data.

The components shown in the memory may also be included in other removable/nonremovable, volatile/nonvolatile computer storage media. For example only, a hard disk drive may read from or write to nonremovable, nonvolatile magnetic media, a magnetic disk drive may read from or write to a removable, non-volatile magnetic disk, and an optical disk drive may read from or write to a removable, nonvolatile optical disk such as a CD ROM or other optical media. Other removable/non-removable, volatile/non-volatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like.

These and other input devices are often connected to the processing unit through the client interface that is coupled to a system bus, but may be connected by other interface and bus structures, such as a parallel port or a universal serial bus (USB). A monitor or other type of display device may be connected to the system bus via an interface, such as a video interface. In addition to the monitor, computers may also include other peripheral output devices such as speakers and printer, which may be connected through an output peripheral interface.

Although many other internal components of the computing unit are not shown, those of ordinary skill in the art will appreciate that such components and the interconnection are well known.

Example

Figure 3:
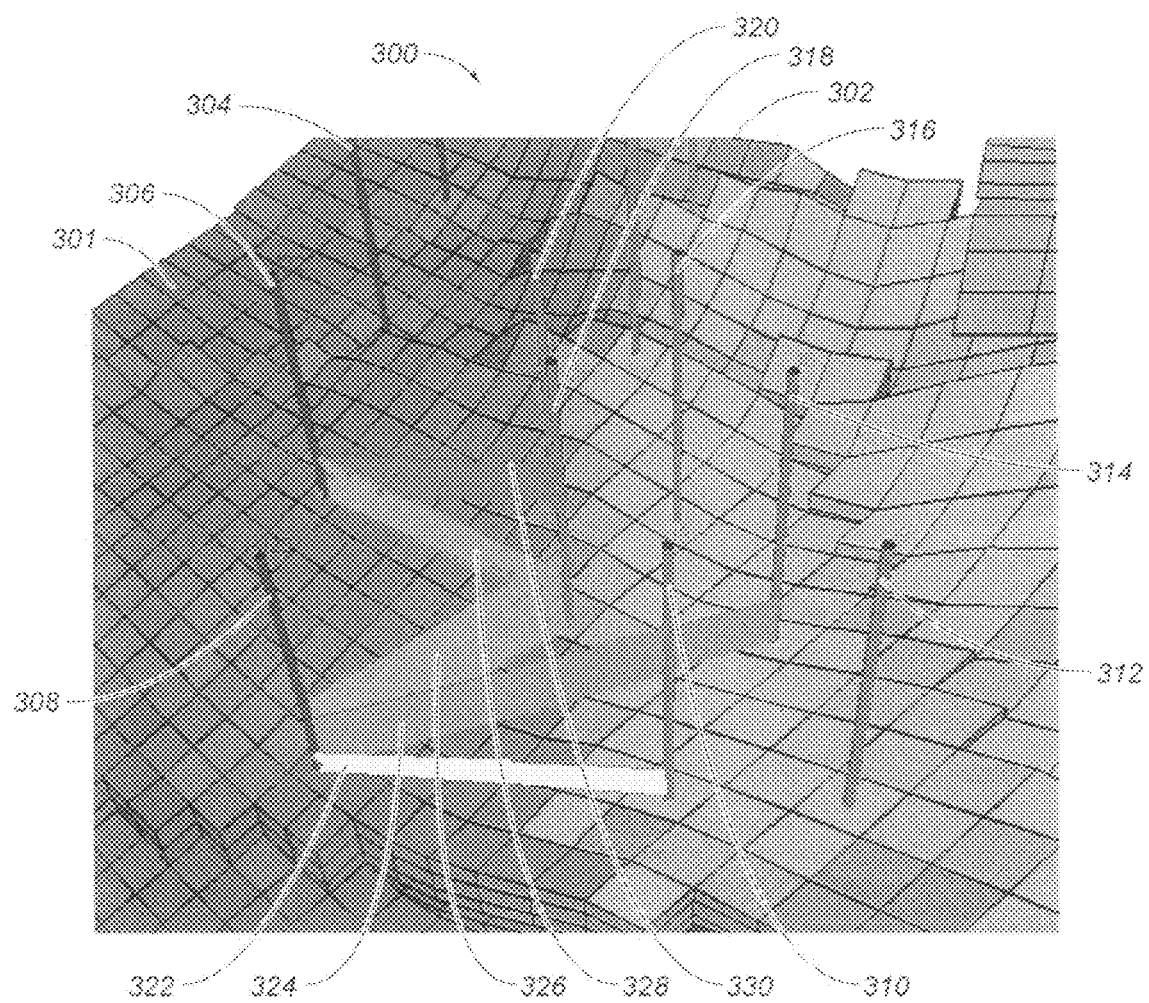
FIG. 3 is an exemplary color display illustrating one implementation of the present invention for rendering well allocation factors among various injection wells and production wells on a three-dimensional reservoir grid.

Referring now to FIGS. 1 and 3 an exemplary display 300 illustrates one implementation of the present invention for rendering well-allocation factors (input/output relationships) among various injection wells (input markers) and production wells (output markers) on a three-dimensional reservoir grid (object). The display 300 includes an image of the reservoir grid 302, a plurality of injection wells (304, 306, 308) and plurality of production wells (310, 312, 314, 316, 318, 320), which are rendered according to steps 102, 104 and 106, respectively, of method 100. The various injection wells (304, 306, 308) and production wells (310, 312, 314, 316, 318, 320) are therefore, rendered in relation to the reservoir grid 302 and each other. As illustrated in FIG. 3, the various injection wells (304, 306, 308) and production wells (310, 312, 314, 316, 318, 320) are rendered on the reservoir grid 302, however, may be selectively rendered in or near the reservoir grid 302, instead.

The reservoir grid 302 also includes at least one attribute, which is illustrated in FIG. 3 by various shades of the color green. The attribute in this example represents an amplitude associated with each cell 301 of the reservoir grid 302. Each cell 301 represents an attribute value that is associated with a particular shade of the color green. Additional attributes, such as frequency, phase, power, semblance, coherency, dip azimuth, gradient, fluid factor, acoustic impedance, velocity, pressure, porosity, permeability, stratigraphy and lithology, may be included in the reservoir grid 302 and distinguished by a different color for each attribute. The attribute values represented on the reservoir grid 302 therefore, may be used as an intuitive visual aid to distinguish areas of higher oil/gas concentration in part of a reservoir represented by the reservoir grid 302.

Each injection well (304, 306, 308) corresponds to an input, for example, water injected into the reservoir grid 302 for stimulating oil/gas production from the reservoir represented by the reservoir grid 302. Likewise, each production well (310, 312, 314, 316, 318, 320) corresponds to an output, for example, oil/gas production from the reservoir represented by the reservoir grid 302.

After steps 108 through 116 are completed in method 100, input/output relationships may be determined and rendered with a three-dimensional image of each injection well, each production well and the reservoir grid in step 120. For example, an input/output relationship 322 is illustrated in the display 300 between the injection well 308 and the production well 310. Additional input/output relationships 324, 326 are illustrated in the display 300 between the injection well 308 and production wells 314, 318, respectively. Additional input/output relationships 328, 330 are illustrated in the display 300 between the injection well 306 and production wells 318, 320, respectively. Any given injection well (304, 306, 308) therefore, may or may not be associated with any given production well (310, 312, 314, 316, 318, 320) by an input/output relationship.

Each input/output relationship (322, 324, 326, 328, 330) may convey various data of interest to a user, such as the percentage of output from a production well affected by an injection well, also commonly referred to as a well-allocation factor. The well-allocation factor may be determined based on well known existing methods and represented as a value between an injection well and a production well. Because each injection well may affect more than one production well, any given injection well (e.g. injection well 308) may have more than one input/output relationship. Likewise, any given production well (e.g., production well 318) may have more than one input/output relationship.

In addition, the input/output relationship value may be depicted as a connection between the injection well and the production well as illustrated in FIG. 3. At least one of a color and a size of the connection may be used to represent the well-allocation factor. A translucent display of the connection, however, may be preferred to reduce interference with the image of the reservoir grid 302. In this manner, the value of a particular input/output relationship may be displayed by an interface device as it passes over such a connection.

Optionally, the end of each injection well and the end of each production well may be associated with the depth of each injection well and the end of each production well, respectively, from a surface to the reservoir represented by the reservoir grid 302. It is therefore, possible to convey the position of each injection well and each production well relative to the reservoir grid 302 and each other in a three-dimensional image as illustrated in FIG. 3. Based on this relationship data, including the attribute values and the input/output relationships, any injection well may be controlled to adjust its stimulation of any production well in order to control the production of oil/gas from the production well and the reservoir. The same relationship data may also aid in determining the number and placement of additional injection wells and/or production wells. Because this relationship data is represented in a three-dimensional image on a single display, the relationships between each injection well, each production well and the reservoir grid, including the input/output relationships, are easier to determine and compare than in conventional two-dimensional formats, particularly where multiple relationships need to be concurrently communicated.

Additional applications in the same field may include, for example, a three-dimensional image of one or more transmitters (input markers) and one or more receivers and/or sensors (output markers) rendered in, on or near a three-dimensional image of an earth formation (object) having at least one attribute and an input/output relationship between one or more of the transmitters and one or more of the receivers/sensors. The input/output relationship may represent, for example, an attribute value.

Because the systems and methods described herein may be used to analyze relationship data, they may be particularly useful in other fields, such as medicine, on human and/or animal bodies, and the like.

While the present invention has been described in connection with presently preferred embodiments, it will be understood by those skilled in the art that it is not intended to limit the invention to those embodiments. It is therefore, contemplated that various alternative embodiments and modifications may be made to the disclosed embodiments without departing from the spirit and scope of the invention defined by the appended claims and equivalents thereof.

The invention claimed is:

1. A method for imaging relationship data as a three-dimensional image, which comprises:
    rendering an object, wherein the object is a three-dimensional reservoir grid having a plurality of grid cells and includes at least one attribute representing one of amplitude, frequency, phase, power, semblance, coherency, dip, azimuth, gradient, fluid factor, acoustic impedance, velocity, pressure, porosity, permeability, stratigraphy and lithology;
    rendering an input marker relative to the object;
    rendering output marker relative to the object;
    processing the input marker and the output marker to produce an input/output relationship;
    rendering a three-dimensional image of the input marker, the output marker, the object and the input/output relationship using a computer processor; and
    displaying the three-dimensional image of the input marker, the output marker, the object and the input/output relationship.

2. The method of claim 1, wherein the input/output relationship is represented as a connection between the input marker and the output marker.

3. The method of claim 2, wherein at least one of a color and a size of the connection represents an allocation factor.

4. The method of claim 3, wherein the allocation factor is a percentage that an output for the output marker is affected by an input for the input marker.

5. The method of claim 1, wherein the input/output relationship is represented as a value between the input marker and the output marker.

6. The method of claim 1, wherein the input marker is rendered in the object and the output marker is rendered in the object.

7. The method of claim 1, wherein the input marker is rendered on the object and the output marker is rendered on the object.

8. The method of claim 1, wherein each grid cell represents an attribute value.

9. The method of claim 1, wherein the input marker is rendered near the object and the output marker is rendered near the object.

10. The method of claim 1, further comprising:
rendering another input marker and another output marker;
processing the another input marker and the another output marker to produce another input/output relationship; and
rendering a three-dimensional image of the another input marker, the another output marker, the object and the another input/output relationship.

11. A non-transitory computer-readable medium tangibly carrying computer executable instructions for imaging relationship data as a three-dimensional image, the instructions being executable to implement:
rendering an object, wherein the object is a three-dimensional reservoir grid having a plurality of grid cells and includes at least one attribute representing one of amplitude, frequency, phase, power, semblance, coherency, dip, azimuth, gradient, fluid factor, acoustic impedance, velocity, pressure, porosity, permeability, stratigraphy and lithology;
rendering an input marker relative to the object;
rendering output marker relative to the object;
processing the input marker and the output marker to produce an input/output relationship;
rendering a three dimensional image of the input marker, the output marker, the object and the input/output relationship; and
displaying the three-dimensional image of the input marker, the output marker, the object and the input/output relationship.

12. The computer-readable medium of claim 11, wherein the input/output relationship is represented as a connection between the input marker and the output marker.

13. The computer-readable medium of claim 12, wherein at least one of a color and a size of the connection represents an allocation factor.

14. The computer-readable medium of claim 13, wherein the allocation factor is a percentage that an output for the output marker is affected by an input for the input marker.

15. The computer-readable medium of claim 11, wherein the input/output relationship is represented as a value between the input marker and the output marker.

16. The computer-readable medium of claim 11, wherein the input marker is rendered in the object and the output marker is rendered in the object.

17. The computer-readable medium of claim 11, wherein the input marker is rendered on the object and the output marker is rendered on the object.

18. The method of claim 11, wherein each grid cell represents an attribute value.

19. The computer-readable medium of claim 11, wherein the marker is rendered near the object and the another marker is rendered near the object.

20. The computer-readable medium of claim 11, further comprising:
rendering another input marker and another output marker;
processing the another input marker and the another output marker to produce another input/output relationship; and
rendering a three-dimensional image of the another input marker, the another output marker, the object and the another input/output relationship.

21. A non-transitory computer-readable medium tangibly carrying a data structure stored thereon, the data structure comprising a data field, the data field comprising a three-dimensional image of an input marker, an output marker, an object and an input/output relationship, wherein the object is a three-dimensional reservoir grid having a plurality of grid cells and includes at least one attribute representing one of amplitude, frequency, phase, power, semblance, coherency, dip, azimuth, gradient, fluid factor, acoustic impedance, velocity, pressure, porosity, permeability, stratigraphy and lithology.

22. The data structure of claim 21, wherein the input/output relationship is represented as a connection between the input marker and the output marker.

23. The data structure of claim 22, wherein at least one of a color and a size of the connection represents an allocation factor.

24. The data structure of claim 21, wherein the input/output relationship is represented as a value between the input marker and the output marker.

25. The data structure of claim 21, wherein each grid cell represents an attribute value.

26. The data structure of claim 21, further comprising another data field, the another data field comprising a three-dimensional image of another input marker, another output marker, the object and another input/output relationship.

* * * * *